(12) United States Patent
Rosenblatt et al.

(10) Patent No.: US 7,739,189 B1
(45) Date of Patent: Jun. 15, 2010

(54) METHOD AND SYSTEM FOR DETECTING LOAN FRAUD

(75) Inventors: Eric Rosenblatt, Derwood, MD (US); Steven J. Holden, Bethesda, MD (US); Milton P. Reid, III, Auckland (NZ); Allen Wong, Vienna, VA (US)

(73) Assignee: Fannie Mae, Washington, DC (US)

(*) Notice: Subject to any disclaimer, the term of this patent is extended or adjusted under 35 U.S.C. 154(b) by 0 days.

(21) Appl. No.: 11/875,404

(22) Filed: Oct. 19, 2007

Related U.S. Application Data

(60) Provisional application No. 60/853,248, filed on Oct. 20, 2006.

(51) Int. Cl.
*G06Q 40/00* (2006.01)

(52) U.S. Cl. .................. 705/38; 35/37; 35/1; 235/376; 726/5

(58) Field of Classification Search .................. 705/35, 705/37, 38, 1; 235/376; 726/5
See application file for complete search history.

(56) References Cited

U.S. PATENT DOCUMENTS

| | | | |
|---|---|---|---|
| 5,819,226 | A | 10/1998 | Gopinathan et al. |
| 5,884,289 | A | 3/1999 | Anderson et al. |
| 6,094,643 | A | 7/2000 | Anderson et al. |
| 6,330,546 | B1 | 12/2001 | Gopinathan et al. |
| 6,597,775 | B2 | 7/2003 | Lawyer et al. |
| 2002/0099649 | A1 | 7/2002 | Lee et al. |
| 2002/0133371 | A1* | 9/2002 | Cole .............................. 705/1 |
| 2003/0093366 | A1* | 5/2003 | Halper et al. .................. 705/38 |
| 2003/0158751 | A1 | 8/2003 | Suresh et al. |
| 2006/0074793 | A1 | 4/2006 | Hibbert et al. |
| 2007/0055595 | A1* | 3/2007 | Keyes et al. ................... 705/35 |
| 2007/0226129 | A1* | 9/2007 | Liao et al. ..................... 705/38 |

FOREIGN PATENT DOCUMENTS

| | | | | |
|---|---|---|---|---|
| CA | 2332255 | * | 7/2002 | .................... 705/1 |
| WO | WO 03/071388 A2 | | 8/2003 | |

OTHER PUBLICATIONS

Basic Statistics & Probability "Sampling and Experimentation", Webpages- 2001.*

Bergsman, Steve, "Cover Report: Fraud and Risk Management—A High-Tech Battle with Fraud", Aug. 2006, pp. 36-43, *Mortgage Banking*, USA.

Berry, et al., "Countrywide's Suit Illustrates Exception Risk—A Common Waiver Played Role in Fraud Case", Sep. 29, 2006, *American Banker*, USA.

(Continued)

*Primary Examiner*—Harish T. Dass
(74) *Attorney, Agent, or Firm*—Foley & Lardner LLP

(57) ABSTRACT

A system and method of detecting potential fraud in connection with mortgage loan lending, where a first group made up of a plurality of mortgage loans is utilized to calculate a representative value associated with a loan-related event. A second group also made up of a plurality of mortgage loans is utilized to calculate a predicted representative value associated with the same loan-related event. The actual and predicted representative values are compared to determine a deviation value. If the deviation exceeds a predetermined threshold, an output indicating potential fraud is generated.

35 Claims, 5 Drawing Sheets

OTHER PUBLICATIONS

Berry, Kate, "Warehouser Suiing Firm, Borrowers in Fraud Case", Oct. 3, 2006, *American Banker*, USA.

Dezube, Dona, "Cover Report: Fraud and Risk Management—Mortgage", Aug. 2006, pp. 44-52, *Mortgage Banking*, USA.

Hagerty et al., "Town's Residents Say They Were Targets of Big Mortgage Fraud" Sep. 28, 2006, *The Wall Street Journal Online*, USA.

Subar, David, "Cover Report: Technology—The New Battle Against Fraud", Mar. 2007, pp. 109-113, *Mortgage Banking*, USA.

Wisniowski, Charles, "Newsmaker—Mortgage Fraud Expert Rachel Dollar—The MortgageFraud Blog", Feb. 2006, pp. 26-31, *Mortgage Banking*, USA.

\* cited by examiner

Loan Grouping and Analysis Logic
120

Loan Grouping Creation Logic
200

Actual Representative Value Calculation Logic
210

Predicted Representative Value Calculation Logic
220

*FIG. 2*

Underwriting Logic
170

- Loan Data Capture Logic 500
- Fraud Risk Assessment Logic 510
- Underwriting Logic 520

FIG. 5

METHOD AND SYSTEM FOR DETECTING LOAN FRAUD

CROSS-REFERENCE TO RELATED PATENT APPLICATIONS

The present application claims priority to U.S. Prov. Ser. No. 60/853,248, entitled "Method and System for Detecting Loan Fraud," filed Oct. 20, 2006, hereby incorporated by reference.

FIELD OF THE INVENTION

The present invention relates generally to the field of mortgage loan lending. More particularly, the present invention relates to a method and system of detecting potential fraud in connection with mortgage loan lending.

BACKGROUND OF THE INVENTION

The purchase of a home is typically the largest investment that a person makes. Because of the amount of money required to purchase a home, most home buyers do not have sufficient assets to purchase a home outright on a cash basis. In addition, buyers who have already purchased a home may wish to refinance their home. Therefore, potential homebuyers consult lenders such as banks, credit unions, mortgage companies, savings and loan institutions, state and local housing finance agencies, and similar organizations, to obtain the funds necessary to purchase or refinance their homes. These lenders offer mortgage products to potential home buyers. The lenders who make (originate and fund) mortgage loans directly to home buyers comprise the "primary mortgage market."

When a mortgage is made in the primary mortgage market, the lender can: (i) hold the loan as an investment in its portfolio, or (ii) sell the loan to investors in the "secondary mortgage market" (e.g., pension funds, insurance companies, securities dealers, financial institutions and various other investors) to replenish its supply of funds. The loan may be sold alone, or in packages of other similar loans, for cash or in exchange for mortgage backed securities (MBS) which provide lenders with a liquid asset to hold or sell to the secondary market. By choosing to sell its mortgage loans to the secondary mortgage market for cash, or by selling the mortgage backed securities, lenders get a new supply of funds to make more home mortgage loans, thereby assuring home buyers a continual supply of mortgage credit.

The ability to assess the credit risk associated with a mortgage loan is important to both lenders and investors in the secondary market. A defaulted loan or a delinquent loan is costly to the owner of the asset (initially the lender in the primary mortgage market). Thus, the lender tries to avoid making loans in situations where there is a significant likelihood that the loan will later default or be delinquent. As a lender improves its ability to determine credit risk associated with a loan, the costs associated with lending go down. Fewer loans are given that default or become delinquent. In the secondary mortgage market, where mortgage loans are commonly sold to investors, fewer defaulted/delinquent loans results in a better return on investment, resulting in increased capital flow to the housing market. Better risk predictions, therefore, decrease the defaults/delinquencies, improve capital flow to the housing market, and ultimately decrease mortgage costs for consumers.

Mortgage loans originated by a lender (or alternatively a broker) are typically underwritten prior to closing. Although the final underwriting decision is made by the lender, the lender may submit a loan to an automated underwriting engine of the investor to determine whether the loan meets the credit risk eligibility and loan product eligibility requirements of the investor based on a set of loan information provided by the lender. Such loan information typically includes borrower-specific risk factors, loan-specific risk factors, and property-specific risk factors. Borrower-specific risk factors may include factors such as the borrower's credit rating or score, as well as other factors such as a borrower's income and financial reserves. Property-specific risk factors may include factors such as the type of property (e.g., manufactured housing, etc.). Loan-specific risk factors may include factors such as the loan-to-value ratio, the loan amount, the loan purpose, and so on.

A growing trend has been to make mortgages easier and faster to obtain. For example, verifying basic information regarding lenders, borrowers, brokers, and their relationships is now often performed using online or Internet products. In addition, brokers and loan officers are asking fewer and fewer probing questions before granting a loan to a potential borrower. On the one hand, loans can be obtained much easier and much faster. On the other hand, instances of mortgage fraud involving loans obtained by providing false information to lenders, forging loan documents, and/or by collusion between lenders, and for example, property appraisers have dramatically increased.

Therefore, given the rise in the occurrence of mortgage fraud, it would be desirable to provide systems and processes that permit primary and secondary market participants to monitor mortgage loan data for patterns of potential mortgage fraud. In particular, it would be desirable to provide systems and processes that identify trends, relationships, and parameters associated with mortgage loans that signal potential fraud.

SUMMARY OF THE INVENTION

According to an exemplary embodiment of the present invention, a method of detecting potential fraud in connection with mortgage loan lending involves calculating at least one actual representative value associated with at least one loan parameter for a plurality of mortgage loans, the at least one actual representative value being calculated from loan data for the plurality of mortgage loans, comparing the at least one actual representative value with at least one predicted representative value associated with the at least one loan parameter, calculating a deviation resulting from the comparison of the at least one predicted representative value with the at least one actual representative value, and upon determining that the deviation exceeds a predetermined threshold, generating an output indicating potential fraud. The calculating, comparing, calculating, and generating steps are performed repeatedly at different times during the lifecycles of the loans in the plurality of mortgage loans.

Although certain features and advantages are described herein, it will be appreciated that the teachings below may be used to implement systems and methods which do not necessarily have any of these features and advantages, but which have other features and advantages.

BRIEF DESCRIPTION OF THE DRAWINGS

FIG. 2 is a diagram highlighting various aspects of the loan grouping logic according to the various embodiments;

FIG. 5 is a diagram highlighting various aspects of the underwriting logic according to the various embodiments.

DETAILED DESCRIPTION OF THE PREFERRED EMBODIMENTS

Before referring to the Figures which illustrate the exemplary embodiments in detail, it should be understood that, while the methods and systems for detecting potential fraud are mainly described in the context of mortgage loans and mortgage loan data processing, the method and system are equally applicable to other types of loans, systems, or financial products.

Figure 1:
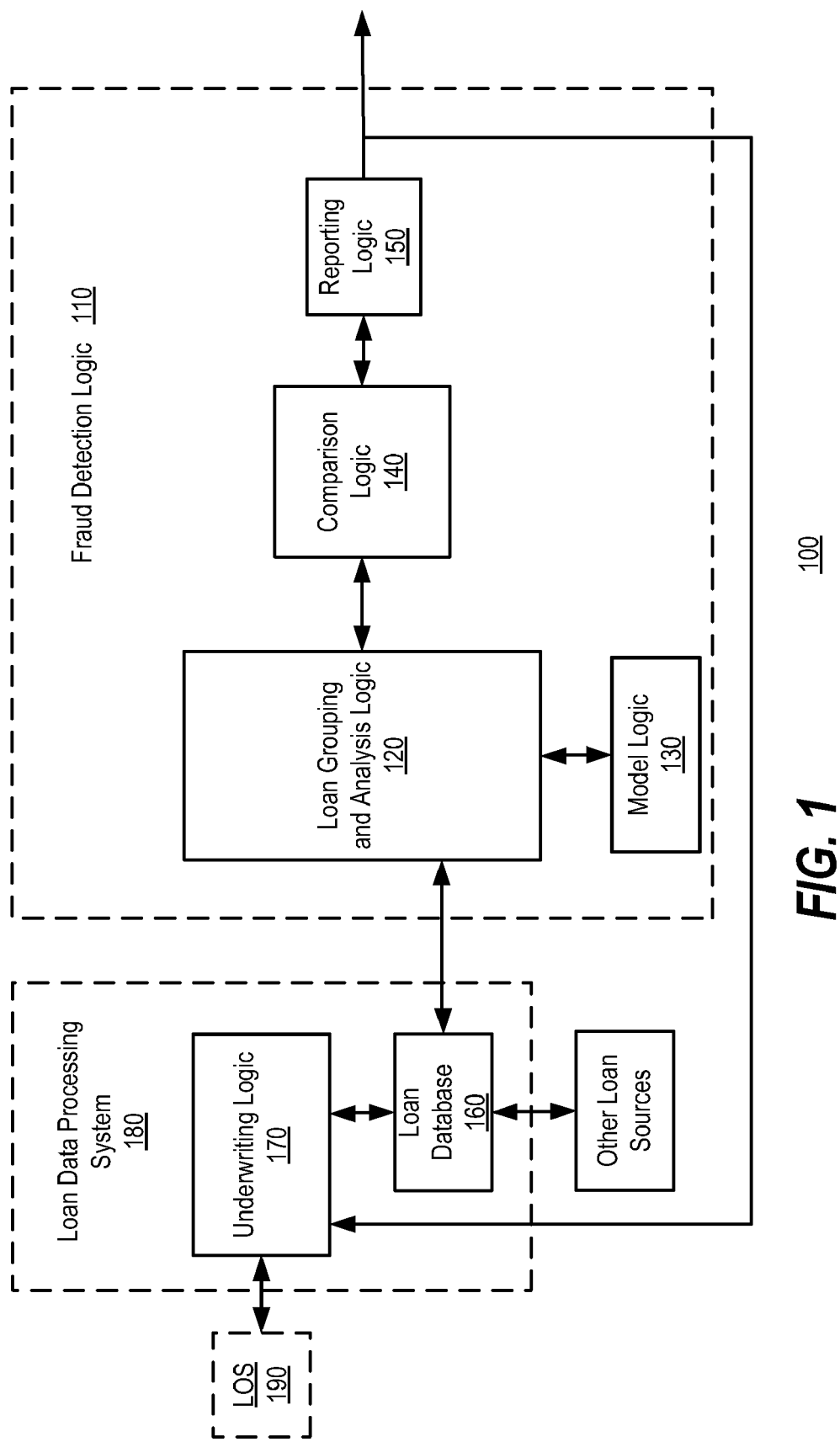
FIG. 1 is an overview diagram of a system configured to detect potential fraud in connection with mortgage loan lending, including an underwriting front-end according to various embodiments.

Referring to FIG. 1, a system 100 is shown that includes fraud detection logic 110 and loan data processing logic 180. Fraud detection logic 110, which may be used to detect potential fraud in connection with mortgage lending, comprises loan grouping and analysis logic 120, model logic 130, comparison logic 140, and reporting logic 150. Loan grouping and analysis logic 120 is configured to define groups of loans for comparison to detect fraud. For example, as described below, loan grouping logic may define a first group (e.g., a test group) of loans and a second group (e.g., a control group) of loans. In addition, loan grouping and analysis logic 120 calculates actual representative values (e.g., average values, median values, other statistically relevant values, and so on) regarding certain loan-related parameters associated with the first group of loans based on actual loan data for the first group of loans. The grouping and analysis logic 120 also calculates predicted representative values regarding the loan related parameters associated with the first group of loans based on actual loan data for the second group of loans. That is, the actual representative value for the second group of loans is used to predict what the actual representative value for the first group of loans should be.

Comparison logic 140 then calculates a deviation between the actual representative and predicted representative values. Thus, if the actual representative value for the first group of loans deviates too much from what is predicted by the actual representative value for the second group of loans, this may indicate potential fraud.

For example, if it is desired to test whether a particular mortgage broker is committing fraud, a test group of loans may be defined in which all loans in the group were originated by the particular mortgage broker under consideration. A control group of loans may be defined which consists of loans which are similar in all respects to the test group of loans, except that they were originated by many different mortgage brokers. The test group and the control group may or may not include overlapping loans. As another example, the control group may comprise all loans in a loan database. The difference or deviation between the representative values of the test and control groups is then determined. If the actual delinquency rate of the test group of loans deviates too much from what is predicted by the delinquency rate of the control group of loans (i.e., absent fraud, the two rates should be approximately the same), then this indicates potential fraud. Further investigation may then be conducted. As another example, appraisal bias may form the basis for comparison of the test and control groups, thereby permitting fraud patterns to be identified based on loan data that is collected prior to underwriting. Thus, if the test group of loans appears to exhibit significantly higher appraisal bias than what is predicted by the appraisal bias exhibited in the control group of loans (as measured, for example, using an automated valuation engine), then this indicates potential fraud. Further investigation may then be conducted.

The comparison logic 140 may, for example, determine whether the deviation exceeds a predetermined threshold. The predetermined threshold identifies an allowable variance between the actual representative and predicted representative values. In other words, if the actual representative and predicted representative values are sufficiently close to each other, it can be presumed that the mortgage loans within the test group do not exhibit any irregularities associated with the loan-related events that may be indicative of potential fraud. However, if the predetermined threshold is exceeded, a determination that potential fraud exists can be assumed, either with one or more of the mortgage loans themselves or by virtue of some relationship or trend exhibited by the mortgage loans within the first group. Instances when the predetermined threshold is exceeded therefore identify a pattern of data or "fraud signature" common to the mortgage loans of the group in which the instances occur.

As will be appreciated, fraud detection logic 110 may be used to search for and detect patterns of data based on any loan parameter, and thus loan grouping logic 120 may group loans in accordance with such parameters. Such parameters may include data associated with a mortgage loan including data generated during origination of the mortgage loan, data generated later during the lifecycle of the mortgage, or other data. Data generated during origination of the mortgage may include, for example, information provided on a loan application by a borrower or loan applicant (e.g., borrower income, borrower contribution, loan purpose, loan type, property type, occupancy status, etc.) and supplemental data obtained by a lender or other entity, such as borrower-specific information (e.g., a borrower's Fair Isaac Corporation (FICO) score), broker-specific information (e.g., a particular broker's name or address), loan-specific information (e.g., mortgage product information, loan term, loan interest rate, loan-to-value ratio), property appraiser-specific information, property-specific information, geography-specific information, and so on. Data generated after loan origination may include, for example, payment history (e.g., timing and amounts of payments, loan defaults, loan delinquencies, other loan-related events, and so on).

In addition, the loan parameters can be used to detect direct or indirect human agency in fraud. Direct agency may be detected using loan parameters that suggest some direct relationship within the loan data, e.g., all mortgage loans originated by the same broker. Indirect agency may be detected using loan parameters that tie together different mortgage loans without direct relationships. For example, a plurality of different mortgage loans can be grouped because the properties associated with each of the different mortgage loans are located within the same geographic area. Therefore, loan grouping logic 120 creates groups of individual mortgage loans, each having one or more common direct and/or indirect parameters between them. Direct parameters can include, but are not limited to any of the above loan data. Indirect loan parameters can include, but are not limited to, geographic areas, where the scope of the geographic area can comprise one or more zip codes, counties, and states, and particular collections of primary loan participants, such as a plurality of brokers working for a particular organization. Loan grouping logic 120 may also be configured based on known information regarding previously identified fraud signatures, e.g., it may be configured to construct test groups to detect certain known types of fraud based on past experience.

Model logic 130 may be accessed by loan grouping and analysis logic 120 to calculate the actual and/or predicted representative values. For example, the actual representative value may relate to the probability of an adverse event occurring in connection with a mortgage loan. Model logic 130 may comprise models used to calculate the probability of such events. For example, the actual representative value may be the average probability of delinquency at one year after origination for each loan in the test group of loans, and the predicted representative value may be the average probability of delinquency at one year after origination for each loan in the control group of loans. If the average probability of delinquency of the loans in the test group of loans is, on average, significantly higher than the average probability of delinquency of the loans in the control group of loans, then this may indicate potential fraud. As will be appreciated, any type of model (e.g. delinquency models, default models, loss models, appraisal/valuation models, other adverse event models, and so on) may be used to calculate actual and/or predicted representative values in this manner.

The reporting logic 150 may generate outputs indicating potential fraud based on the results of the comparison performed by comparison logic 140. For example, the reporting logic 150 may generate notifications indicating instances when the predetermined threshold is exceeded and/or actual fraud signatures are detected. Such notifications may be received and used by lenders, secondary mortgage market participants, or other entities. As another example, the reporting logic 150 may generate a fraud score representing, e.g., the probability of potential fraud as indicated by the amount of deviation of the actual representative value from the predicted representative value. The rating or score associated with a particular loan parameter can also be output as one method of prioritizing further potential fraud investigation, i.e., a particular area code having a certain score may be investigated first as that particular area code could have a higher probability of being associated with fraud.

The fraud detection logic 110 may be used after origination (e.g., to systematically search for fraud in a portfolio of mortgages), during origination (e.g., during underwriting), or at another time. For example, after origination, fraud detection logic 110 may be used to search for fraud within a portfolio of loans on a periodic basis (e.g., daily, monthly, yearly, etc.). Each time a search is performed, various ways of grouping loans (e.g., associated with different types of mortgage fraud) may be systematically tested. Trends or relationships between the mortgage loans in the loan portfolio, identified by a fraud signature, can be investigated for any potentially underlying fraud.

During origination, fraud detection logic 110 may be accessed by an automated underwriting engine or underwriting logic 170 to screen mortgage loan applications for potential fraud. Thus, as shown in FIG. 1, loan data processing system 180 may be configured to receive loan application data from loan originators (e.g., lenders or third party originators such as brokers) using loan origination systems 190 at underwriting logic 170. LOS 190 may access loan data processing system 180 through a data connection, such as the Internet or an Intranet, or other suitable network. LOS 190 may receive underwriting recommendations for loan applications from underwriting logic 170 and/or may be used to perform other functions associated with underwriting and originating loans (e.g., obtaining pricing, performing committing functions, and so on).

To detect fraud at origination, one or more test groups may be defined having loan parameters in common with the loan application that is being underwritten. For example, if the loan application is being submitted by a particular mortgage broker, then a test group may be constructed which consists of mortgage loans originated by that mortgage broker and may be compared against a control group consisting of mortgage loans originated by other mortgage brokers. If potential fraud is detected in the test group, then this may impact that the response the is provided. As another example, if it is the appraiser that forms the basis of the test group, and if potential fraud is detected in the test group, than an underwriting message may be sent warning that there may be potential fraud and that the appraisal should be verified. Thus, notifications may be sent at the point of loan origination, i.e., a loan data processing system 180, where it can be used to aid in the screening of new or otherwise incoming mortgage loans. As another example, the algorithm may be executed in advance, and a list of potentially fraudulent agents (e.g., a list of potentially fraudulent mortgage brokers or appraisers) may be stored for use during underwriting. Once a problematic loan parameter has been identified as described above, any new or otherwise incoming individual mortgage loans can be checked, as part of or in addition to the underwriting process, to determine if they are associated with one or more problematic loan parameters. In other words, the new or otherwise incoming individual mortgage loans can be checked for an identified fraud signature.

It may be noted that the database 160 may comprise loan data for loans originated by many different lenders. For example, if the fraud detection logic 110 and the database 160 is operated by a secondary mortgage market purchaser of mortgage loans, the database 160 may comprise loan data for loans purchased from a variety of lenders in the secondary mortgage market. Notifications output from reporting logic 150 can be given to primary mortgage market participants such as lenders to aid in the detection of potential fraud on a smaller scale. On the other hand, if the fraud detection logic 110 and the database 160 is operated by an entity in the primary mortgage market it may, for example, detect fraud based on test groups and control groups consisting of loans in its own portfolio. In addition, loan data gathered by a primary mortgage market participant, such as during the underwriting process described above can be utilized by secondary mortgage market participants in creating models and predictive algorithms.

FIG. 2 illustrates exemplary loan grouping logic 120 in greater detail. Loan grouping logic 120 includes loan grouping creation logic 200, actual representative value calculation logic 210, and predicted representative value calculation logic 220. Loan grouping creation logic 200 is used to group the mortgage loans received by the database 160 into various groups according to certain loan parameters found in the loan data for the mortgage loans.

Actual representative value calculation logic 210 is used to calculate an actual representative (e.g., average, median, etc.) value that may represent, for example, a number of times or rate at which a particular loan-related event occurred within the first group of mortgage loans. As another example, the actual representative value may represent the number of times or rate at which a particular loan-relate event is expected to occur in the first group of loans based on modeling performed by modeling logic 130 (e.g., an expected delinquency rate at one year determined using modeling logic 130). Loan-related events may be any event that may be useful in detecting fraud or that have a bearing on credit losses. For example, loan-related events can include loan delinquency, loan default, over appraisal of property, excessive rise in property value, shortness of time between property sales, number of properties owned by a single borrower, and so on. Therefore, representative value calculation logic 210 can, for example, determine a delinquency rate for a first group of mortgage loans, where the first group comprises a plurality of mortgage loans, each of which is associated with the name of a particular parameter under consideration (e.g., a particular mortgage broker). As another example, representative value calculation logic 210 may calculate an average appraisal value of properties within a particular area code, where the appraisals of the properties have been performed by a particular property appraiser.

Predicted representative value calculation logic 220 is used to calculate a predicted representative (e.g., average, median, etc.) value that may represent, for example, the number of times or rate at which a particular loan-related event is predicted to have occurred within the test group of mortgage loans as indicated by the number of times the particular loan-related event occurred within the control group of mortgage loans. As another example, the predicted representative value may represent the number of times or rate at which a particular loan-related event is expected to occur in the control group of loans based on modeling performed by modeling logic 130 (e.g., an expected delinquency rate at one year determined using modeling logic 130). Assuming no fraud, this value should then be an accurate prediction of the expected delinquency rate for the test group of loans. As another example, the predicted representative value may be calculated directly from the models without using data for a control group of loans. For example, the predicted representative value may represent the number of times or rate at which a particular loan-related event is expected to have occurred in the test group of loans as calculated using loan data for the test group of loans in the modeling logic. Thus, if the modeling logic 130 performs exceptionally poorly at predicting the number of times or rate at which a particular loan-related event is expected to have occurred for the test group of loans, but the modeling logic 130 performs well with other groups of loans, this may indicate potential fraud. The unexplainable poor performance of the modeling logic 130 may indicate the existence of potential fraud.

Model logic 130 utilizes a plurality of algorithms to determine values for expected delinquency rates, expected default rates, expected loss rates, and so on. These algorithms can include, but are not limited to, one or more mathematical or statistical formulas developed for one or more particular loan-related events and/or loan parameter performance measures. The various algorithms themselves may be derived using predictive modeling. Predictive modeling involves using model groups of loan data to provide a basis from which empirical predictions regarding the particular loan-related events and the loan parameter performance measures can be determined. Such models may be used to calculate both actual representative values (e.g., expected delinquency rates) and predicted representative values (e.g., expected delinquency rates calculated for the control group and used to predict the expected delinquency rates for the test group). Just as the algorithms can target particular loan-related events and loan parameter performance measures, the model groups of loan data can also be developed for various targets as well. The loan data itself, within a model group, can comprise previously collected, actual loan data or simulated loan data.

The one or more algorithms may be designed to target a specific loan-related event, such as for example, loan delinquency. For example, the one or more algorithms may predict an average number of occurrences of loan delinquency that should occur, where the one or more algorithms consider additional loan parameters common to the mortgage loans within the subset of loan data, such as borrowers with the same FICO score and other parameters. Alternatively, the one or more algorithms calculate an average number of occurrences of loan delinquency that should occur among the loans within the subset of loan data without considering the loan parameter upon which the creation of the subset of loan data was based, i.e., the particular lender.

Figure 3:
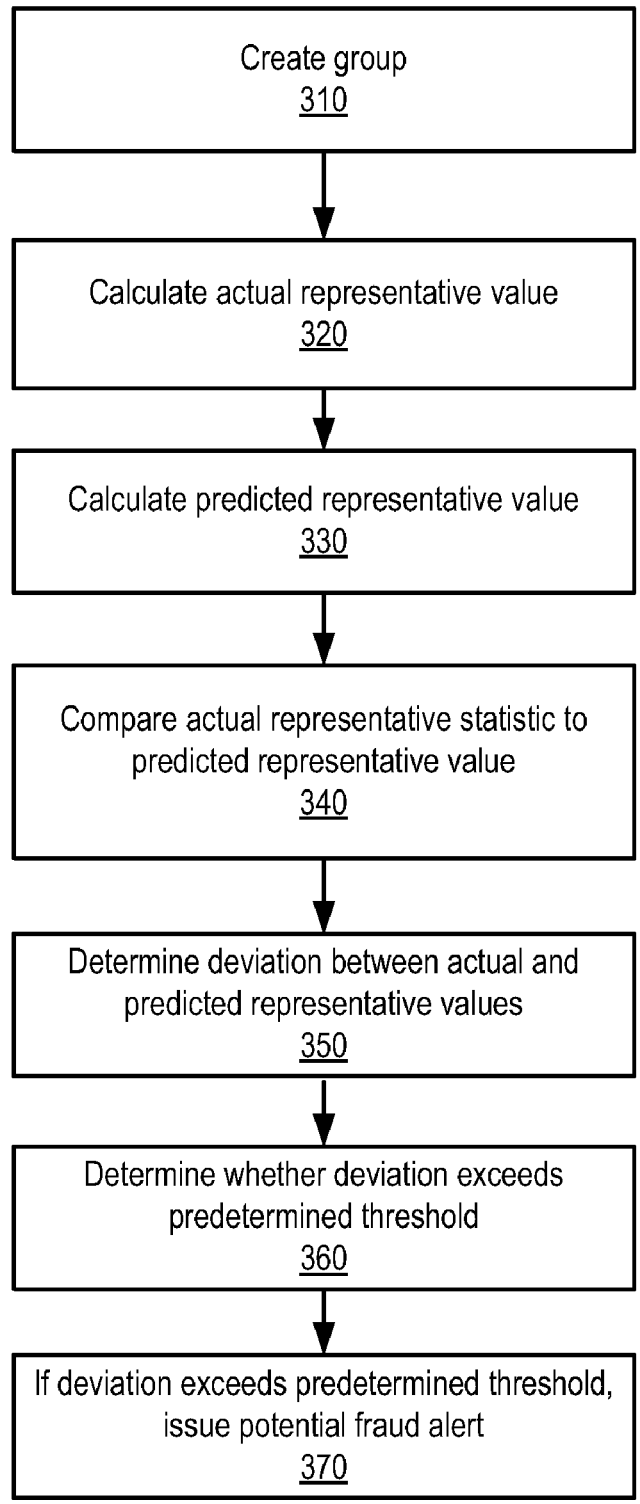
FIG. 3 is flow chart describing the process of detecting potential fraud in connection with mortgage loan lending according to an embodiment.

FIG. 3 illustrates a flow chart describing a method 300 of detecting potential fraud according to one embodiment. Method 300 may be implemented using, for example, the system 100 shown in FIG. 1. At step 310, a group of mortgage loans is created based upon one or more particular loan parameters. For example, individual loans, each having been originated by a particular lender, are grouped together.

At step 320, an actual representative value is calculated for a first group of mortgage loans. For example, the average number of times an instance of loan delinquency has occurred among the mortgage loans within the group created at step 310 is calculated. At step 330, a predicted representative value is calculated for a second group of mortgage loans.

At steps 340 and 350, the actual representative value is compared to the predicted representative value, and a deviation between the two values is determined. At step 360, it is determined whether the deviation exceeds some predetermined threshold, where exceeding that predetermined threshold is indicative of a pattern that is unlikely. The predetermined threshold can be set to any desired value (e.g., to implement any desired level of sensitivity) depending on the particular loan-related event or events being targeted so that a deviation exceeding the predetermined threshold would be statistically impossible or some other sensitivity level. Referring again to the loan delinquency example, the predicted representative value may indicate that only 1% of the mortgage loans in the second group of mortgage loans should go delinquent, or that delinquency should only occur 1% of the time throughout the lifetime of the mortgage loans. If for example, the actual representative value indicates that 5% of the loans in the first group of mortgage loans have gone delinquent, or that delinquency with the mortgage loans actually occurred 5% of the time throughout the lifetime of the individual mortgage loans, it can be assumed that some type of fraud has likely occurred within the first group. A 4% deviation between the actual representative and predicted representative values may be indicative of some anomalous activity, i.e., potential fraud related to some common loan parameter, e.g., a particular lender, associated with all of the mortgage loans within the first group of mortgage loans.

At step 370, upon a determination that the predetermined threshold has been exceeded for that particular loan-related event or events, the common loan parameter is identified as being potentially fraudulent or involved in fraud. Alternatively, by virtue of some relationship or trend exhibited by the mortgage loans within the first group contributing to exceeding the predetermined threshold, potential fraud can be identified with further investigation.

Figure 4:
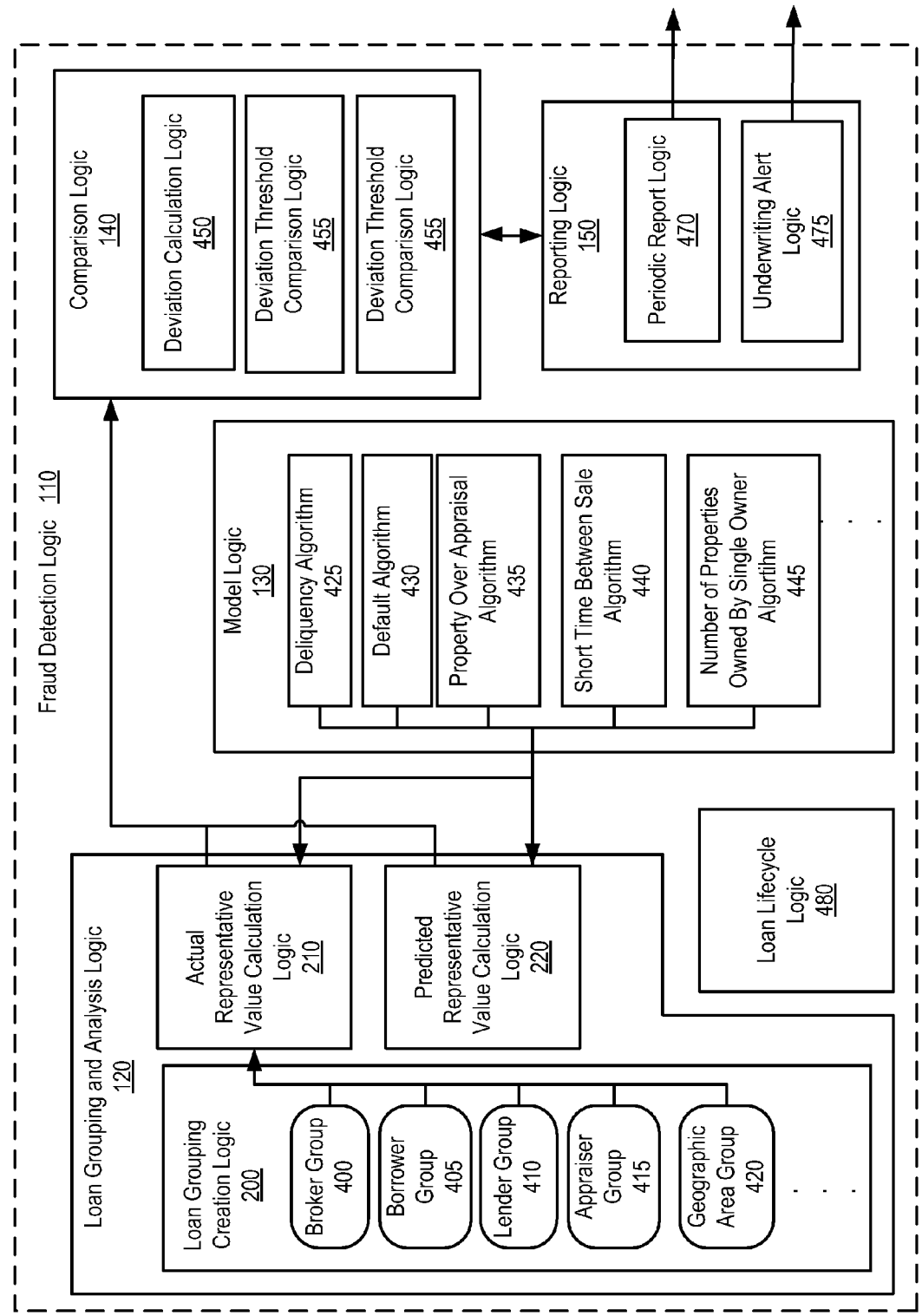
FIG. 4 is a detailed view of the fraud detection logic utilized by the various embodiments.

FIG. 4 illustrates the fraud detection logic 110 in greater detail. As described above, the fraud detection logic 110 includes loan grouping and analysis logic 120, model logic 130, comparison logic 140, and reporting logic 150. Loan grouping logic 120 also includes loan grouping creation logic 200, actual representative value calculation logic 210, and predicted representative value calculation logic 220. In one embodiment, logic 210 and 220 may be the same computational logic, with different groups of loans applied to calculate the actual and predicted representative values. Within loan grouping creation logic 200, FIG. 4 shows various examples of loan groups, such as broker group 400, borrower group 405, lender group 410, appraiser group 415, and geographic area group 420 from which actual representative value calculation logic 210 determines an actual representative value associated with one or more loan-related events. Predicted representative value calculation logic 220 in turn determines a predicted representative value associated with the one or more loan-related events as described above.

Model logic 130 includes various algorithms that are utilized when calculating the representative values, such as for example, a delinquency rate algorithm 425, a default rate algorithm 430, a property over-appraisal algorithm 435, a short time between sale algorithm 440, a number of properties owned algorithm 445, and so on. Other algorithms may be added as frauds are detected. For example, if a pattern indicating potential fraud or a particular fraud signature is identified either by an earlier iteration of the fraud detection logic 110 or some other outside source, that fraud signature can be integrated into a new algorithm and applied to the various groups of mortgage loans.

Comparison logic 140 includes deviation calculation logic 450, deviation threshold comparison logic 455, and deviation scoring logic 460. After comparison logic 140 receives the actual and predicted representative values from loan grouping logic 120, deviation calculation logic 450 compares an actual representative value calculated by actual representative value calculation logic 210 to a predicted representative value calculated by predicted representative value calculation logic 220 to arrive at a deviation value. Deviation threshold comparison logic 455 then compares the calculated deviation value to a predetermined threshold to determine whether the calculated deviation value exceeds the predetermined threshold. Deviation scoring logic 460 may be used to generate scores reflecting the extent of deviation and indicating the probability of fraud, as described above.

If comparison logic 140 determines that an instance where a certain calculated deviation value exceeds the predetermined threshold has occurred, a notification of this instance is sent to reporting logic 150. The notification may include relevant loan data, such as a loan parameter found to be common to each mortgage loan within the tested group of loans. Notifications may be generated on a periodic basis or on a one-time basis, e.g., during underwriting. Periodic report logic 470 outputs reports including such notifications on a monthly basis, for example. In addition, underwriting alert logic 475 may outputs a report or other data set including the notifications to the underwriting logic 170 shown in FIG. 1. Such notifications may be used as alerts for flagging individual loan applications that could potentially be associated with fraudulent activity during underwriting. Reports may also be generated showing rankings (e.g., rankings of mortgage brokers, rankings of appraisers, and so) based on the scores which reflect the extent of deviation and indicating the probability of fraud.

It should be noted that the fraud detection logic 110 may be operated to execute continuously at some predefined period, thereby enabling systematic searches for frauds to be performed on a periodic (e.g., daily, monthly, etc.) basis throughout the lives of loans in a loan portfolio. Furthermore, additional logic 480 may be used to track the life-cycles of individual loans and prompt the fraud detection logic 110 to operate at desired periods before, during, and/or after the life cycle of the individual loans or upon the occurrence of specific events. For example, when a loan goes into default, a new test group, as described above, may be defined. An actual representative value may be calculated from the new test group which includes the defaulted loan, and a predicted representative value may be determined from a control group having other parameters in common with the mortgage loans in the new test group. The method of detecting potential fraud as described above may then be performed to determine whether the defaulted loan is part of a larger pattern of defaulted loans.

Referring back to FIG. 1, loan data processing system 180 includes underwriting logic 170 and is coupled to the database 160 configured to store data received by loan data processing system 180. Loan data processing system 180 may also be coupled to third party service provider systems (not shown) to obtain, for example, a requested credit report, title, MI, etc. Loan data processing system 180 is preferably configured to support various transactions which may be executed by a purchaser in connection with one or more loans. For example, underwriting logic 170 receives loan data from an originator system 190 and returns an underwriting recommendation and any other requested information to the originator system. The term "underwriting" as used herein refers generally to the process of evaluating a loan application to determine the risk involved for a lender.

FIG. 5 shows underwriting logic 170 in greater detail. Underwriting logic 170 includes at least loan data capture logic 500, fraud risk assessment 510, and underwriting logic 520. Data capture logic 500 is used to receive loan data or information (e.g., loan data from originator system 190 or another source) to be used in loan underwriting and appraisal. Typically, the loan data or information that is received by data capture logic 500 for loan underwriting includes information provided on a loan application by a borrower or loan applicant, and supplemental data provided by a lender, such as borrower-specific information, loan-specific information, and property-specific information. For example, the loan data or information may include data such as, credit report data, loan product information, loan term, loan-to-value ratio, an appraisal value (e.g., submitted by a borrower or loan applicant), income, borrower contribution, loan purpose, loan type, property type, occupancy status, broker information, etc.

Fraud risk assessment logic 110 may determine whether a risk of potential fraud exists for an individual loan received by loan data capture 500. As described above, the fraud detection logic 110 outputs monitoring data to underwriting logic 170. The fraud risk assessment logic 510 utilizes this monitoring data to identify any loan parameters, such as the borrower-specific, loan-specific, and/or property-specific described above, known or suspected of being associated with fraudulent activity, that might also be associated with a current individual loan undergoing the underwriting process. Underwriting logic 520 then determines if an individual loan meets credit risk and eligibility requirements of a purchaser or of a lender for the purposes of its portfolio, and provides an underwriting recommendation based on the assessment of the overall risk profile of the loan. It may be noted that underwriting logic 520 can combine a fraud risk assessment from the fraud risk assessment logic 510 with other underwriting-related assessments, such as a credit risk assessment (not shown) and a valuation assessment (not shown) to come to a decision. In addition, underwriting logic 520 may be used to generate reports that provide information regarding the underwriting recommendation for a particular loan, information used in determining the recommendation (e.g., property, loan, and borrower information), information regarding the potential existence of a fraudulent loan parameter, and information summarizing key statistics from the credit report (e.g., borrower's open accounts, derogatory accounts, and undisclosed accounts).

Thus, in an exemplary embodiment, fraud detection logic 110 searches for patterns among collections of mortgage loans related by direct or indirect human agency that are unlikely to occur randomly and therefore indicate a linkage between the loans that represents manipulations by the agent in question.

In an exemplary embodiment, the pattern is detected by comparing average or median aggregate values of a collection of loan-related values or characteristics, compared to the predicted average or median for that value or characteristic, based on some model or empirical expectation for that value or characteristic. The method of collecting loans into a group relates to some theory of potential fraud agency. As described, one example is comparing the average delinquency of a group of loans originated by a particular mortgage broker to the expected delinquency of that group of loans, regardless of broker but given all other characteristics of the loans. If the measured average delinquency of the loans from that broker are so far from the expected average that its probability of random occurrence is minute, then this indicates that the broker may have manipulated some factor and caused the negative credit performance. An investigation into possible fraud may then be launched.

In an exemplary embodiment, the parameters examined may be parameters that have a known negative bearing on credit losses, such as delinquency, over appraisal, or too rapid rise in home value (after controlling for local economics); but any parameter that could theoretically play a role in fraud might be used. For instance: shortness of time between home sales, or numbers of homes owned by a single borrower. A search may be made for fraud signatures or unusual data patterns, e.g., because they have been detected in prior known frauds or are theorized to be means to fraud.

In an exemplary embodiment, loans may be grouped for the purpose of searching for unlikely values or medians by a theory of agency, that is, under the idea that a fraud conspiracy requires some individual or group of individuals to have access to all the loans in the fraud in order to effectuate the fraud. One way to collect loans is by a known mortgage agent who plays a specific role in the loan process, such as broker, loan officer, or appraiser. But indirect collections may be used as well, for instance, geographic proximity that allows a single group of agents to operated on the group.

The method of and system for detecting potential fraud may generally be implemented as part of a computerized system. For example, engines and systems of system 100 may utilize existing computer capabilities, both hardware and software, and electronic communication links, for example, to receive and process (e.g., in real time) loan data provided by a broker, a lender, etc. The fraud detection logic and the loan data processing system 180 and engines and subsystems thereof may be implemented on computer systems or devices and may include computer servers. An exemplary computer system or device may include a general purpose computing device including a processing unit, a system memory, and a system bus that couples various system components including the system memory to the processing unit. The system memory may include read only memory (ROM) and random access memory (RAM). The computer may also include a magnetic hard disk drive for reading from and writing to a removable magnetic disk, and an optical disk drive for reading from or writing to a removable optical disk such as a CD-ROM or other optical media. The drives and their associated computer-readable media provide nonvolatile storage of computer-executable instructions, data structures, program modules, and other data for the computer. The various logic elements may be implemented on a separate logical server or using separate physical devices.

Exemplary computer systems or servers in system 100 may operate under the control of computer software to carry out the process steps described herein. Computer software for each system or engine may include a set of software objects and/or program elements including computer-executable instructions collectively having the ability to execute independently in a separate thread or logical chain of process evaluation, while permitting the flow of data inputs therebetween. Computer-executable instructions comprise, for example, instructions and data which cause a general or special purpose computer system or processing device to perform a certain function or group of functions.

Data may be communicated between the various systems and engines of system 100 in real time over the Internet or other computer network environment using logical connections to one or more remote computers having processors. Logical connections may include a local area network (LAN) and a wide area network (WAN) that are presented here by way of example and not limitation. Such networking environments are commonplace in office-wide or enterprise-wide computer networks, intranets and the Internet. It will be appreciated that such network computing environments will typically encompass many types of computer system configurations, including personal computers, hand-held devices, multi-processor systems, microprocessor-based or programmable consumer electronics, network PCs, minicomputers, mainframe computers, and the like. System 100 may also be implemented in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

It will be further be appreciated that system 100 may perform fewer or additional functions as compared to those described herein. For example, an entity (e.g., a lending institution) that performs only some of the above-mentioned processes may use a computer system that contains only a subset of the functions described herein. Additionally, one or more of the systems or functions of system 100 may be variously combined in alternative configurations.

The foregoing description of embodiments has been presented for purposes of illustration and description. It is not intended to be exhaustive or to be limited to the precise forms disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated. It is intended that the scope of the invention be defined by the claims appended hereto and their equivalents.

We claim:

1. A method of detecting potential fraud in connection with mortgage loan lending, comprising:

calculating, using computer-implemented actual representative value calculation logic, at least one actual representative value associated with at least one loan parameter for a first plurality of mortgage loans, the at least one actual representative value being calculated from loan data for the first plurality of mortgage loans;

comparing, using computer-implemented deviation calculation logic, the at least one actual representative value with at least one predicted representative value associated with the at least one loan parameter for a second plurality of mortgage loans, the at least one predicted representative value being calculated using computer-implemented predicted representative value calculation logic;

calculating, using the computer-implemented deviation calculation logic, a deviation resulting from the comparison of the at least one predicted representative value with the at least one actual representative value; and upon determining, using computer-implemented deviation threshold comparison logic, that the deviation exceeds a predetermined threshold, generating an output, using computer-implemented reporting logic, indicating potential fraud among the first plurality of mortgage loans; and wherein the calculating, comparing, calculating, and generating steps are performed repeatedly at different times during the lifecycles of the loans in at least one of the first and second pluralities of mortgage loans.

2. The method of claim 1, wherein the at least one loan parameter relates to at least one of a borrower-specific risk factor, a loan-specific risk factor, a property-specific risk factor, and a collateral-specific risk factor.

3. The method of claim 1, wherein the at least one loan parameter comprises at least one of a borrower identifier, a loan interest rate, a borrower FICO score, equity accumulated by a borrower, a loan officer identifier, a broker identifier, loan underwriter identifier, and an appraiser identifier.

4. The method of claim 1, wherein the first plurality of mortgage loans is grouped based upon the at least one loan parameter common to each mortgage loan of the first plurality of mortgage loans.

5. The method of claim 4, wherein the at least one actual representative value comprises a representative value representing a number of actual occurrences of an event related to the at least one loan parameter.

6. The method of claim 5, wherein the at least one predicted representative value is derived from a predetermined model, the at least one predicted representative value comprising a representative value representing a number of predicted occurrences of an event related to the at least one loan parameter.

7. The method of claim 6, wherein the predetermined model is based upon all loan parameters common to each loan of the first plurality of mortgage loans except for the at least one loan parameter.

8. The method of claim 4 wherein the grouping of the first plurality of mortgage loans is determined so as to comprise mortgage loans from a predetermined geographical area.

9. The method of claim 4, wherein the grouping of the first plurality of mortgage loans is determined so as to comprise mortgage loans originated by a particular mortgage broker.

10. The method of claim 1, wherein the detecting of the potential fraud is performed repeatedly at intervals throughout a life cycle of each of the mortgage loans.

11. The method of claim 10, wherein the intervals are periodic.

12. The method of claim 10, wherein the intervals are aperiodic.

13. The method of claim 1, further comprising periodically outputting reports indicating whether deviations exceeding the predetermined threshold exist.

14. The method of claim 1, wherein a loan portfolio of a secondary loan market participant is scanned for patterns involving deviations exceeding the predetermined threshold.

15. The method of claim 1, further comprising outputting monitoring data associated with the determination that the deviation exceeds a predetermined threshold to a loan underwriting application.

16. The method of claim 1, wherein the potential fraud is indicative of at least one of direct human agency fraud and indirect human agency fraud.

17. A system for detecting potential fraud in connection with mortgage loan lending, comprising:

a memory for storing a plurality of mortgage loans;

a processor operatively connected to the memory and including computer code for testing the mortgage loans for potential fraud repeatedly at different times during the lifecycles of the loans in the plurality of mortgage loans, including:

computer code for calculating at least one actual representative value associated with at least one loan parameter for a first group of the plurality of mortgage loans, the at least one actual representative value being calculated from loan data for the plurality of mortgage loans;

computer code for comparing the at least one actual representative value with at least one predicted representative value associated with the at least one loan parameter for a second group of the plurality of mortgage loans;

computer code for calculating a deviation resulting from the comparison of the at least one predicted representative value with the at least one actual representative value; and computer code for upon determining that the deviation exceeds a predetermined threshold, generating an output indicating potential fraud among the first group of the plurality of mortgage loans.

18. The system of claim 17, wherein the at least one loan parameter relates at least one of a borrower-specific risk factor, a loan-specific risk factor, a property-specific risk factor, and a collateral-specific risk factor.

19. The system of claim 17, wherein the at least one loan parameter includes at least one of a borrower identifier, a loan interest rate, a borrower FICO score, equity accumulated by a borrower, a loan officer identifier, a broker identifier, loan underwriter identifier, and an appraiser identifier.

20. The system of claim 17, wherein the first group is based upon the at least one loan parameter common to each mortgage loan of the first group.

21. The system of claim 20, wherein the at least one actual representative value comprises a representative value representing a number of actual occurrences of an event related to the at least one loan parameter.

22. The system of claim 21, wherein the at least one predicted representative value is derived from a predetermined model, the at least one predicted representative value comprising a representative value representing a number of predicted occurrences of an event related to the at least one loan parameter.

23. The system of claim 22, wherein the predetermined model is based upon all loan parameters common to each loan of the first group except for the at least one loan parameter.

24. The system of claim 17, wherein the first group is determined so as to comprise mortgage loans from a predetermined geographical area.

25. The system of claim 17, wherein the detecting of the potential fraud is performed repeatedly at intervals throughout a life cycle of each of the mortgage loans.

26. The system of claim 25, wherein the intervals are periodic.

27. The system of claim 25, wherein the intervals are aperiodic.

28. The system of claim 17, wherein the processor further comprises computer code for periodically outputting reports indicating whether deviations exceeding the predetermined threshold exist.

29. The system of claim 17, wherein the processor further comprises computer code for scanning loan portfolio of a secondary loan market participant for patterns involving deviations exceeding the predetermined threshold.

30. The system of claim 17, wherein the processor further comprises outputting monitoring data associated with the determination that the deviation exceeds a predetermined threshold to a loan underwriting application.

31. The method of claim 17, wherein the potential fraud is indicative of at least one of direct agency fraud and indirect agency fraud.

32. The system of claim 17, wherein the first group is determined so as to comprise mortgage loans originated by a particular mortgage broker.

33. A method of detecting potential fraud in connection with mortgage loan lending, comprising:
repeatedly defining a test collection of loans, via at least one of computer-implemented loan grouping creation logic and computer-implemented loan lifecycle logic, throughout a life cycle of each loan making up the test collection of loans, each loan having loan-related events and loan-related parameters;
calculating, via computer-implemented actual representative value calculation logic, an actual representative value representing a probability of occurrence of at least one loan-related event among the repeatedly defined test collection of loans;
calculating, via computer-implemented predicted representative value calculation logic, a predicted representative value representing a probability of occurrence of the at least one loan-related event among a control collection of loans, wherein the control collection of loans shares at least one loan with the periodically defined test collection of loans;
comparing, via computer-implemented deviation calculation logic, the actual representative value and the predicted representative value to arrive at a deviation value;
determining, via computer-implemented deviation threshold comparison logic, whether the deviation value exceeds a deviation threshold;
identifying at least one of the loan-related parameters associated with the at least one loan-related event as being indicative of potential fraud among the test collection of loans if the deviation value exceeds the deviation threshold;
analyzing instances of the identifying of the at least one of the loan-related parameters to determine a pattern of potentially fraudulent activity associated with the at least one of the loan-related parameters; and
repeatedly outputting a notification, via computer-implemented reporting logic, of the at least one of the loan-related parameters identified as being indicative of potential fraud to a secondary market loan participant.

34. A method of detecting potential fraud in connection with mortgage loan lending, comprising:
repeatedly defining, via at least one of computer-implemented loan grouping creation logic and computer-implemented loan lifecycle logic, a group of loans throughout a life cycle of each loan making up the group of loans, wherein each loan comprises a plurality of loan-related events and a plurality of loan-related parameters, and wherein the repeatedly defined group is based upon one of either at least one of the plurality of loan-related parameters common to each loan of the repeatedly defined group of loans and a predetermined geographical area;
calculating, via computer-implemented actual representative value calculation logic, from the repeatedly defined group of loans, at least one actual representative value representing a number of actual occurrences of at least one loan-related event;
comparing, via computer-implemented deviation calculation logic, the at least one actual representative value with at least one predicted representative value, wherein the at least one predicted representative value is calculated via computer-implemented predicted representative value calculation logic and represents a number of predicted occurrences of the at least one loan-related event, and wherein the at least one predicted representative value is derived from a predetermined model based upon all loan-related parameters common to each loan of the repeatedly defined group of loans except for at least one of the plurality of loan-related parameters;
calculating, via computer-implemented deviation calculation logic, a deviation resulting from the comparison of the at least one predicted representative value with the at least one actual representative value;
upon determining that the deviation exceeds a predetermined threshold, identifying the at least one of the plurality of loan-related parameters as being indicative of potential fraud;
analyzing instances of the identifying of the at least one of the plurality of loan-related parameters within a loan portfolio of a secondary market loan participant to determine if a pattern of potentially fraudulent activity associated with the at least one of the loan-related parameters exists, wherein the loan portfolio is comprised in part, of the repeatedly defined group of loans; and
periodically outputting, via computer-implemented reporting logic, a notification of the instances wherein the identifying of the at least one of the plurality of loan-related parameters to be indicative of potential fraud occurs to the secondary market loan participant and to a loan underwriting application.

35. A computer-implemented method of detecting potential
fraud in connection with a plurality of mortgage loans, the method comprising:
determining, via computer-implemented predicted representative value calculation logic, a predicted representative value for a parameter of the plurality of mortgage loans;
determining, via computer-implemented actual representative value calculation logic, an actual representative value for the parameter;
comparing, via computer-implemented deviation calculation logic, the actual representative value with the predicted representative value; and
determining, via computer-implemented deviation threshold comparison logic, whether to generate an output, via reporting logic, indicating potential fraud among the plurality of mortgage loans based on the comparison of the actual representative value with the predicted representative value.

* * * * *